United States Patent [19]

Liu et al.

[11] Patent Number: 5,153,263

[45] Date of Patent: Oct. 6, 1992

[54] PLASTICIZED POLYETHERIMIDE ESTER BLENDS

[75] Inventors: Ping Y. Liu, Naperville, Ill.; Russell J. McCready, Downington, Pa.

[73] Assignee: General Electric Company, Pittsfield, Mass.

[21] Appl. No.: 752,958

[22] Filed: Aug. 29, 1991

Related U.S. Application Data

[63] Continuation-in-part of Ser. No. 600,268, Oct. 22, 1990, abandoned, which is a continuation of Ser. No. 139,928, Dec. 31, 1987, abandoned.

[51] Int. Cl.$^5$ .................... C08L 79/08; C08L 33/08; C08L 31/04
[52] U.S. Cl. .................... 525/166; 525/167; 525/179; 525/180; 525/183
[58] Field of Search ............... 525/166, 167, 179, 180, 525/183

[56] References Cited

U.S. PATENT DOCUMENTS 4,639,486  1/1987  Liu .................................. 525/433
4,659,765  4/1987  Liu .................................. 525/445

*Primary Examiner*—James J. Seidleck
*Assistant Examiner*—David Buttner
*Attorney, Agent, or Firm*—Daniel DeJoseph

[57] ABSTRACT

Novel thermoplastic elastomeric molding compositions having excellent physical properties, which comprise a polyetherimide ester elastomer modified with a modifier composition comprising (i) at least one olefin acrylate copolymer; or (ii) at least one ethylene vinyl acetate copolymer; or a combination of (i) and (ii).

15 Claims, No Drawings

PLASTICIZED POLYETHERIMIDE ESTER BLENDS

This is a continuation-in-part of co-pending application Ser. No. 07/600,268 filed on Oct. 22, 1990 now abandoned which is a continuation of co-pending application Ser. No. 139,928 filed on Dec. 31, 1987 now abandoned.

The present invention relates to novel thermoplastic elastomeric molding compositions. These compositions have a number of excellent and highly desirable physical properties including impact strength and/or moldability. In addition, these compositions exhibit improved flexibility and can thereby be utilized in applications such as electrical coils, hoses, and the like.

BACKGROUND OF THE INVENTION

Polyetherimide ester elastomers comprised of the reaction products of (a) a low molecular weight diol, (b) a dicarboxylic acid, (c) a high molecular weight poly(oxy alkylene)diamine, and (d) a tricarboxylic acid or its derivative are known and are described in U.S. Pat. Nos. 4,544,734 and 4,556,705 to McCready and in U.S. Pat. No. 4,556,688 to McCready et al. These polyetherimide esters exhibit excellent stress-strain properties, low modulus, high heat deflection temperature and/or excellent strength/toughness characteristics, which properties render said polyetherimide esters especially suitable for molding and extrusion applications.

SUMMARY OF THE INVENTION

The polyetherimide ester elastomers utilized in the present invention are well known elastomers and are described in U.S. Pat. Nos. 4,544,734 and 4,566,705 to McCready and in U.S. Pat. No. 4,566,688 to McCready et al., all of which are incorporated herein by reference.

It has now been discovered that the flexibility of these polyetherimide ester elastomers can be improved so that the elastomers can be used in desirable applications such as electrical coils and wiring, hoses, and the like.

The compounds of the present invention are comprised of (a) at least one polyetherimide ester elastomer; a modifying amount of (b) at least one olefin acrylate copolymer; or (c) at least one ethylene vinyl acetate copolymer, or a combination of (b) and (c).

DETAILED DESCRIPTION OF INVENTION

The polyetherimide ester elastomers utilized in the invention contain imide groups, polyether groups, and ester groups in the polymer chain. They are comprised of the reaction products of:

(i) at least one diol;
(ii) at least one dicarboxylic acid or its ester forming reactive derivative; and
(iii) a set of reactants selected from
(a) (1) at least one high molecular weight poly(oxy alkylene)diamine, and (2) at least one tricarboxylic acid or its derivative, or
(b) at least one high molecular weight polyoxyalkylene diimide diacid.

Suitable diols (i) for use in the preparation of the polyetherimide ester polymers of the present invention include the saturated and unsaturated aliphatic and cycloaliphatic dihydroxy compounds as well as the aromatic dihydroxy compounds. These diols are preferably of a low molecular weight, i.e., having a molecular weight of about 300 or less. When used herein, the term "diol" and "low molecular weight diol" should be construed to include equivalent ester forming derivatives thereof provided, however, that the aforementioned molecular weight requirement pertains to the diols only and not to their ester forming derivatives. Exemplary of ester forming derivatives of diols there may be given the acetates of the diols as well as, for example, ethylene oxide or ethylene carbonate for ethylene glycol.

The preferred saturated and unsaturated aliphatic and cycloaliphatic diols are those having from 2 to about 15 carbon atoms. Exemplary of these diols there may be given ethylene glycol, propanediol, butanediol, pentanediol, 2-methyl propanediol, 2,2-dimethyl propanediol, hexanediol, decanediol, 1,2-, 1,3- and 1,4- cyclohexane dimethanol, butenediol, hexenediol, etc. Especially preferred are 1,4-butanediol and mixtures thereof with hexanediol, 1,4-cyclohexane dimethanol, or butenediol, most preferably 1,4-butanediol.

Aromatic diols suitable for use in the practice of the present invention are generally those having from 6 to about 15 carbon atoms. Included among the aromatic dihydroxy compounds are resorcinol, hydroquinone, 1,5-dihydroxy naphthalene, 4,4'dihydroxy naphthalene, 4,4'-dihydroxy diphenyl, bis(p-hydroxy phenyl)methane and bis(p-hydroxy phenyl)-2,2-propane.

Especially preferred diols are the saturated aliphatic diols, mixtures thereof, and mixtures of a saturated diol(s) with an unsaturated diol(s), wherein each diol contains from 2 to about 8 carbon atoms. Where more than one diol is employed, it is generally preferred that at least about 60 mole %, based on the total diol content, be the same diol, more preferably at least 80 mole %. As mentioned above, the preferred compositions are those in which 1,4-butanediol is present in a predominant amount, most preferably when 1,4-butanediol is the only diol.

Dicarboxylic acids (ii) which are suitable for use in the practice of the present invention are aliphatic, cycloaliphatic, and/or aromatic dicarboxylic acids. These acids are preferably of a low molecular weight, i.e., having a molecular weight of less than about 300. However, in some cases higher molecular weight dicarboxylic acids may be used. The term "dicarboxylic acids" as used herein, includes equivalents of dicarboxylic acids having two functional carboxyl groups which perform substantially like dicarboxylic acids in reaction with glycols and diols in forming polyesters. These equivalents include esters and ester forming reactive derivatives, such as acid halides and anhydrides. The molecular weight preference mentioned above pertains to the acid and not to its equivalent ester or ester-forming derivatives. Thus, an ester of a dicarboxylic acid having a molecular weight greater than about 300 or an acid equivalent of a dicarboxylic acid having a molecular weight greater than about 300 are included provided the acid has a molecular weight below about 300. Additionally, the dicarboxylic acids may contain any substituent groups(s) or combinations which do not substantially interfere with the polymer formation and use of the polymer of this invention.

Aliphatic dicarboxylic acids, as the term is used herein, refer to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radical such as —O— or —SO$_2$—.

Representative aliphatic and cycloaliphatic acids which can be used for this invention are sebacic acid, 1,2-cyclohexane dicarboxylic acid, 1,3-cyclohexane dicarboxylic acid, adipic acid, glutaric acid, succinic acid, oxalic acid, dimer acid, 4-cyclohexene-1, 2-dicarboxylic acid, 2-ethylsuberic acid, tetramethylsuccinic acid, cyclopentane dicarboxylic acid, decahydro-1,5 naphthlene dicarboxylic acid, 4,4'-bicyclohexyl dicarboxylic acid, decahydro-2,6 naphthalene dicarboxylic acid, 4,4 methylenebis(cyclohexane carboxylic acid), 3,4-furan dicarboxylic acid, and 1,1-cyclobutane dicarboxylic acid. Preferred aliphatic acids are cyclohexane dicarboxylic acids, sebacic acid, glutaric acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl)methane, oxybis(benzoic acid), ethylene-1,2-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and C$_1$-C$_{12}$ alkyl, alkoxy, and aryl ring substitution derivatives thereof. Hydroxy acids such as p(beta-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acids with an aliphatic and/or cycloaliphatic dicarboxylic acid, most preferably the aromatic dicarboxylic acids. Among the aromatic acids those with 8-16 carbon atoms are preferred, particularly the benzene dicarboxylic acids, i.e., phthalic, terephthalic and isophthalic acids and their dimethyl derivatives. Especially preferred is dimethylterephthalate.

Finally, where mixtures of dicarboxylic acids are employed in the practice of the present invention, it is preferred that at least about 60 mole %, preferably at least 80 mole %, based on 100 mole % of dicarboxylic acid (ii) be the same dicarboxylic acid or ester derivative thereof. As mentioned above, the preferred compositions are those in which dimethylterephthalate is the predominant dicarboxylic acid, most preferable when dimethylterephthalate is the only dicarboxylic acid.

The polyetherimide ester polymers of the present invention may be prepared by a one-pot synthesis involving the reaction of the diol (i), the dicarboxylic acid (ii), the high molecular weight poly(oxy alkylene)diamine (iii)(a)(1), and the tricarboxylic acid or its derivative (iii)(a)(2). In such a synthesis the polyoxyalkylene diimide diacid (iii)(b) is formed in-situ by the reaction of the poly(oxy alkylene)diamine with the tricarboxylic acid.

The poly(oxy alkylene)diamines (iii)(a)(1) suitable for use in the present invention may be represented by the following general formula

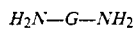

$$H_2N-G-NH_2 \qquad (I)$$

wherein G is the radical remaining after the removal of the amino groups of a long chain alkylene ether diamine. These polyether diprimary diamines are available commercially from Texaco Chemical Company under the trademark JEFFAMINE. In general they are prepared by known processes for the amination of glycols. For example, they may be prepared by aminating the glycol in the presence of ammonia, Raney nickel catalyst and hydrogen as set forth in Belgium Pat. No. 634,741. Alternately, they may be prepared by treating glycol with ammonia and hydrogen over a Nickel-Copper-Chromium catalyst as taught by U.S. Pat. No. 3,654,370. Other methods for the production thereof include those taught by U.S. Pat. Nos. 3,155,728 and 3,236,895 and French Nos. 1,551,605 and 1,466,708, all of the foregoing patents being incorporated herein by reference.

The long chain ether diamines suitable for use herein are the polymeric diamines having terminal (or as nearly terminal as possible) amine groups and an average molecular weight of from about 600 to about 12,000, preferably from about 900 to about 4,000. Additionally, the long chain ether diamines will generally have a carbon-to-oxygen ratio of from about 1.8 to about 4.3.

Representative long chain ether diamines are the poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide); terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines prepared by reacting formaldehyde with diols such as 1,4-butanediol and 1,5-pentanediol and subsequently aminating are useful. Especially preferred poly(alkylene ether) diamines are poly(propylene ether)diamine, poly (tetramethylene ether)diamine, and the poly(ethylene)glycols which are end-capped with poly (propylene ether) and/or propylene oxide and subsequently aminated.

In general, the polyoxyalkylene diamines useful in the practice of the present invention have an average molecular weight of from about 600 to about 12,000, preferably from about 900 to about 4,000.

The tricarboxylic acid (iii)(a)(2) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic acid component, any number of suitable tricarboxylic acid constituents will occur to those skilled in the art including 2,6,7-naphthalene tricarboxylic anhydride, 3,3',4-dipheneyl tricarboxylic anhydride, 3,3',5-benzophenone tricarboxylic anhydride, 1,3,4-cyclopentane tricarboxylic anhydride, 2,2',3-diphenyl tricarboxylic anhydride, diphenyl sulfone-3,3',4-tricarboxylic anhydride, ethylene tricarboxylic anydride, 1,2,5-naphthalene tricarboxylic anhydride, 1,2,4-butane tricarboxylic anhydride, and 1,3,4-cyclohexane tricarboxylic anhydride. These tricarboxylic acid materials can be characterized by the following general formula

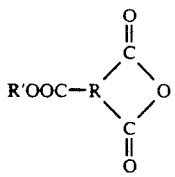
II.

wherein:

R is a trivalent organic radical, preferably a $C_1$-$C_{20}$ aliphatic or cycloaliphatic, or $C_6$-$C_{20}$ aromatic trivalent radical;

R' is preferably hydrogen or a monovalent organic radical which is preferably selected from $C_1$-$C_6$ aliphatic and/or cycloaliphatic radicals and $C_6$-$C_{12}$ aromatic radicals, e.g., benzyl; R' is most preferably hydrogen.

In the preparation of the instant polyetherimide ester polymers sufficient amounts of diol versus dicarboxylic acid, and tricarboxylic acid versus diamine must be present, as recognized in the art, to allow for substantially complete polymerization.

This type of one-pot reaction involving the reactions of (i) a diol component, (ii) a dicarboxylic acid component, (iii)(a)(1) a poly(oxy alkylene)diamine component, and (iii)(a)(2) a tricarboxylic acid component is described in U.S. Pat. No. 4,556,688 to McCready et al. incorporated herein by reference. In this type of one-pot reaction the amount of diol (i) employed will be, in general, a molar excess, preferably about 1.5 molar equivalents, based on the combined molar equivalents of diicarboxylic acid (ii) and of the total moles of the tricarboxylic acid (iii)(a)(2). The amount of the tricarboxylic acid employed will preferably be about two molar equivalents based on the number of moles of the poly(oxy alkylene) diamine. Obviously, less than two molar equivalents would result in incomplete imidization of the diamine resulting in potentially poorer properties. Conversely, greater than two molar equivalents of the tricarboxylic acid may lead to cross-linking and/or branching of the polymer. Generally, mole ratios of 2 moles tricarboxylic acid to 0.85 to 1.15 moles of poly(oxy alkylene)diamine yield useful polymers.

The amount by which the diamine (iii)(a)(1) and the dicarboxylic acid (ii) are used is generally not critical in forming the polyetherimide esters of the present invention. However, preferred amounts of the poly(oxy alkylene)diamine and dicarboxylic acid used are such that the weight ratio of the theoretical amount of the polyoxyalklyene diimide diacid, formable from the poly(oxy alkylene)diamine and the tricarboxylic acid, to the dicarboxylic acid is from about 0.002 to 2.0:1, preferably from about 0.01 to 2.0:1, and more preferably from about 0.25 to 2.0, and most preferably from about 0.4 to 1.4. The actual weight ratio will be dependent upon the specific poly(oxy alkylene)diamine and tricarboxylic acid used and more importantly upon the desired physical and chemical properties of the resultant polyetherimide ester. In general, the lower ratio of the theoretical amount of polyoxyalklylene diimide diacid to dicarboxylic acid the better the strength, crystallization and heat distortion properties of the polymer. Alternatively, the higher the ratio, the better the flexibility, tensile properties and low temperature impact characteristics.

The instant polyetherimide esters may also be prepared by a two-pot synthesis involving the reaction of the diol (i), the dicarboxylic acid (ii), and the polyoxyalkylene diimide diacid (iii) (b). Such a reaction is described in U.S. Pat. No. 4,556,705 to McCready, incorporated herein by reference. Basically, in this process the poly(oxy alkylene)diamine is reacted with the tricarboxylic acid to form a polyoxyalkylene diimide diacid, and the preformed polyoxyalkylene diimide diacid is then reacted with the diol and the dicarboxylic acid to form the polyetherimide ester polymers.

The polyoxyalkylene diimide diacid (iii)(b) may be represented by the general formula

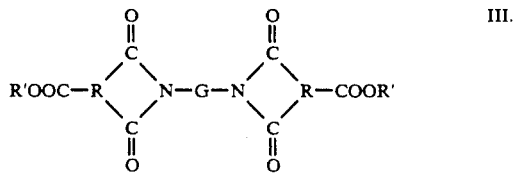
III.

wherein G, R and R' are as defined hereinafore.

The polyoxyalkylene diimide diacids of Formula III suitable for use herein are high molecular weight diimide diacids having an average molecular weight greater than about 700, preferably greater than about 900. They may be prepared by the imidization reaction of one or more tricarboxylic acids (iii)(a)(2) containing two vicinal carboxyl groups or an anhydride group and an additional carboxyl group which must be esterifiable with the high molecular weight poly(oxy alkylene)diamine (iii)(a)(1). These polyoxyalkylene diimide diacids and processes for their preparation are disclosed in U.S. Pat. No. 4,556,705, incorporated herein by reference. Briefly, these polyoxyalkylene diimide diacids may be prepared by known imidization processes including melt synthesis or by synthesizing in a solvent system. Such reactions generally occur at temperatures from about 100° C. to about 300° C., preferably at temperatures from about 150° C. to about 250° C., while drawing off water or in a solvent system at the reflux temperature of the solvent or azeotropic (solvent) mixture.

In this two-pot process, as in the one-pot process described hereinafore, it is generally preferred that the diol be present in at least a molar equivalent amount, preferably a molar excess, most preferably at least 150 mole % based on the moles of dicarboxylic acid and polyoxyalkylene diimide diacid combined. Such molar excess of diol generally allows for optimal yields, based on the amount of acids, while accounting for the loss of diol during esterification.

In this two-pot process the amount of polyoxyalkylene diimide diacid and dicarboxylic acid utilized is generally not critical in forming the polyetherimide esters of the present invention. However, preferred amounts of the polyoxyalkylene diimide diacid and dicarboylic acid are such that the weight ratio of the polyoxyalkylene diimide to the dicarboxylic acid is from about 0.002 to 2.01:1, preferably from about 0.01 to 2.01:1, more preferably from about 0.25 to 2.0:1, and most preferably from about 0.4 to 1.4:1.

It is also possible, as described in U.S. Pat. No. 4,556,688, to prepolymerize the aromatic dicarboxylic acid and the diol to form a prepolyester, and then react this prepolyester with either the diimide diacid or with the tricarboxylic acid and the poly(oxy alkylene)diamine. Forming the prepolyester can be achieved by conventional esterification techniques such as those described in U.S. Pat. Nos. 2,465,319 and 2,910,466, all of which are incorporated by reference.

In its preferred embodiment, the polyetherimide esters of the instant invention comprise the reaction products of dimethylterephthalate, optionally with up to 40 mole percent of another dicarboxylic acid or its ester forming derivative; butane diol, optionally with another diol such as butene diol, hexanediol, or cyclohexane dimethanol; and either a poly(oxy alkylene)diamine having and average molecular weight of from about 600 to about 12,000, preferably from about 900 to about 4,000, and trimellitic anhydride, or a polyoxyalkylene diimide diacid.

In the process of the present invention, particularly where all of the reactants are charged to the reactor together or where the polyoxyalklene diimide diacid is preformed and excess tricarboxylic acid is present, a minor amount of the tricarboxylic acid or anhydride may react with available hydroxyl groups and ultimately function as a branching agent in the finished polymer. Within limits, the degree of branching in the finished polymer can be controlled by varying the mole ratio of tricarboxylic acid to poly(oxy alkylene)diamine. An excess of diamine reduces the degrees of branching, while an excess of the tricarboxylic acid increases branching. In addition to controlling branching by varying the tricarboxylic acid/diamine mole ratio, one can compensate for branching by introducing a monofunctional reactant such as benzoic acid in minor amounts.

With reference to branching, it should be noted that polymers of this invention, when prepared from preformed diimide diacid, are substantially free of branching. If branching is desired, one needs only to introduce a branching agent, such as trimellitic anhydride, along with the preformed diimide diacid. The amount of branching agent will generally be less than about 0.15 moles per mole of diimide diacid. Useful branching agents other than trimellitic anhydride include trimethyl trimellitate, glycerol, trimethylol propane, trimesic acid and its esters, and the like.

The instant polyetherimide esters may be prepared by conventional esterification/condensation reactions for the production of polyesters. These processes are described, inter alia, in U.S. Pat. Nos. 3,763,109; 3,651,014; 3,801,547; 4,556,705, and 4,556,688, all of which are incorporated herein by reference.

The polyetherimide esters of the instant invention contain at least the following two recurring structural units;

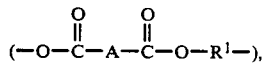

and

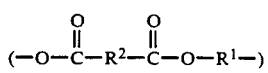

wherein:
A is the residue of the polyoxyalkylene diimide diacid absent the two carboxyl groups, i.e.,

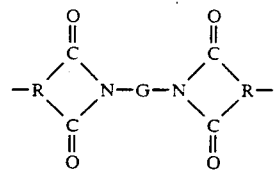

$R^1$ is the residue of the diol absent the two hydroxyl group, $R^2$ is the residue of the dicarboxylic acid absent the two carboxyl groups, and R and G are as defined above in structure (III).

Additionally, while not required, it is customary and preferred to utilize a catalyst or catalyst system in the process for the production of the present polyetherimide esters. These types of catalysts are set forth in U.S. Pat. Nos. 4,556,705 and 4,566,688, both of which are incorporated herein by reference.

Both batch and continuous methods can be used for any stage of the ether imide ester polymer preparation. Polycondensation of the polyester prepolymer with the polyoxyalkylene diimide diacid can also be accomplished in the solid phase by heating finely divided solid polyester prepolymer with the diimide diacid in a vacuum or in a stream of inert gas to remove liberated low molecular weight diol. This method has the advantage of reducing degradation because it must be used at temperatures below the softening point of the prepolymer.

The foregoing thermoplastic elastomers are modified to improve their flexibility without giving up any of their desired physical characteristics by admixing them with a modified amount of at least one olefin acrylate copolymer or at least one olefin acetate copolymer or, preferably, a combination of at least one olefin acrylate copolymer and at least one olefin acetate copolymer.

The olefin acrylate copolymer which is utilized in the present invention is made from an olefin, e.g., ethylene, propylene, or the like, copolymerized with one or more of a comonomer comprising a $C_1-C_6$ alkyl acrylate, e.g., methyl acrylate, ethyl acrylate, hexyl acrylate, and the like; a $C_1-C_6$ alkyl methacrylate, e.g., methyl methacrylate, propyl methacrylate, hexyl methacrylate, and the like; acrylate acid, methacrylate acid; or mixtures thereof. Especially preferred are the well known copolymers of ethylene with an alkyl ester of acrylate acid. These are described in U.S. Pat. No. 2,953,551, which is hereby incorporated herein by reference. Generally, the acrylate or methacrylate portion of the copolymer can range from about 10 to about 30 weight percent. The olefin portion of the copolymer can range from about 70 to about 90 weight percent. The preferred copolymer for use as component (iii) is an ethylene ethyl acrylate, preferably one in which the weight ratio of the ethylene fraction is about 4.5 to 1. Suitable olefin acrylate copolymers, as defined hereinafore, can be prepared by methods well known in the art or can be obtained commercially, as for example Union Carbide's ethylene ethyl acrylate copolymer Bakelite DPD-6169.

The ethylene vinyl acetate copolymer utilized in the present invention are well known in the art. One suitable ethylene vinyl acetate copolymer, for example, is "Elvalay", which is manufactured by DuPont Corporation.

The polymers which are utilized in the modifier combination will generally have molecular weights in the range between about 100,000 to about 1,000,000.

The modifier comprises from about 5 to about 65 weight percent, preferably from about 20 to about 40 weight percent, based on the weight of the total composition.

The olefin acrylate copolymer, when used either alone or in combination with the ethylene vinyl acetate copolymer, will preferably comprise from about 5 to about 45, most preferably from about 20 to about 30, percent by weight of the total composition; and The ethylene vinyl acetate copolymer, when used either alone or in combination with the olefin acrylate copolymer, will preferably comprise from about 5 to about 40, most preferably from about 15 to about 35, percent by weight of the total composition.

The instant compositions may also optionally contain an add-on amount of such commonly known and used additives as oxidative stabilizers; thermal stabilizers, ultraviolet radiation stabilizers; and fillers as long as such additives do not affect the advantageous properties of the modifier of the present invention.

Many of the oxidative and/or thermal stabilizers known in the art for polyester elastomers may be used in the practice of the present invention. These may be incorporated either during polymerization or while in a hot melt stage following polymerization. Satisfactory stabilizers of this type include the phenols and their derivatives, compounds containing both hydroxyl and amine groups, hydroxyazines, oximes, polymeric phenolic esters, and salts of multivalent metals in which the metal is in its lower valence state. Some specific examples of these stabilizers are described in U.S. Pat. No. 4,556,688, incorporated herein by reference.

The ultraviolet radiation stabilizers include, but are not limited to, the benzophenone derivatives, benzotriazole derivatives, and cyanoacrylates.

The fillers include, but are not limited to, carbon black, silica gel, alumina, clays, talc, and chopped fiberglass or glass particles. These fillers may be incorporated in amounts up to about 50 weight percent, preferably up to about 30 weight percent.

The compositions of the present invention may be prepared by any of the well-known techniques for preparing the polymer blends or add mixtures, with extrusion blending being preferred. Suitable devices for the blending include single screw extruders, twin screw extruders, internal mixers such as the Bambury Mixer, heated rubber mills (electric of oil heat) or Farrell continuous mixers. Injection molding equipment can also be used to accomplish blending just prior to molding, but care must be taken to provide sufficient time and agitation to insure uniform blending prior to molding.

Alternatively, the ingredients may be dry blended prior to extrusion or injection molding.

Finally, as mentioned above, the modifier combination may be pre-compounded prior to compounding with the polyetherimide ester resin.

DESCRIPTION OF THE PREFERRED EMBODIMENT

The following examples are presented to more fully and clearly illustrate the present invention. Examples 3-5 illustrates compositions of the present invention, while Examples 1-2 illustrate compositions that fall outside of the present invention. They Examples are presented as illustrative of the invention and are not to be construed as limiting the invention thereto. In the examples all parts and percentages are on a weight basis unless otherwise specified.

All compositions were prepared by melt blending the polyetherimide ester elastomer with the other components in a Prodex single screw extruder.

Physical properties of these compositions were determined in accordance with ASTM methods as follows:

| Notched Izod | ASTM D256 |
| Shore D | ASTM D2240 |

TABLE I

| | EXAMPLES | | | | |
| --- | --- | --- | --- | --- | --- |
| | 1 | 2 | 3 | 4 | 5 |
| PEI | 100 | 70 | 75 | 80 | 50 |
| EEA | — | — | 25 | — | 21 |
| EVA | — | — | — | 20 | 29 |
| STAB (phr) | 1 | 1 | 1 | 1 | 1 |
| PE | — | 30 | — | — | — |
| Double Gate Notched Izod | NB | Broke | NB | NB | NB |
| Shore D | 42 | 38 | 37 | 36 | 32 |

PEI is a polyetherimide ester elastomer comprised of the reaction or products of (a) a low molecular weight diol; (b) a dicarboxylic acid; (c) a high molecular weight poly(oxy alkylene)diamine; and (d) a tricarboxylic acid.

EEA is ethylene ethyl acrylate copolymer.

EVA is ethylene vinyl acetate copolymer.

STAB is a hindered phenolic resin stabilizer, Irganox 1010, a trademark of Ciba Geigy Corporation for tetrakis methylene (3,5-di-t-butyl-4-hydroxyhydrocinnamate).

PE is a polyethylene, CPE 2552, a tradename of the Dow Chemical Company for a chlorinated polyethylene resin having a chlorine content of 25%.

As indicated by the above Example, the compositions of the present invention shows reduced Shore D hardness that results without sacrificing impact strength. Example 1, which is the unmodified polyetherimide resin, has higher Shore D hardness than the Example of the invention. Although Example 2, which used chlorinated polyethylene as a modifier, shows reduced Shore D hardness over Example 1, there was a marked decrease in impact strength, as shown by the embrittled Notched Izod results.

In comparative tests set forth below as Examples 6-9, which illustrate compositions which fall outside of the present invention, the same polyetherimide ester elastomer utilized in Examples 1-5 was compounded with various components using the same method of preparation as was used for Examples 1-5. The stabilizer and EVA used in Examples 6-9 were the same as used in Examples 1-5. The various formulations for each of Examples 6-10 and the test results achieved in the Double Gate Notch Izod and Shore D tests are set forth in Table II below:

TABLE II

| | EXAMPLES | | | |
| --- | --- | --- | --- | --- |
| | 6 | 7 | 8 | 9 |
| PEI | 50 | 95 | 80 | 50 |
| PMMA | — | 5 | 20 | 21 |
| EVA | — | — | — | 29 |
| STAB (phr) | 1 | 1 | 1 | 1 |
| FR | 50 | — | — | — |
| Double Gate Notched Izod | 10.1 | 2.6 | * | 1.6 |

TABLE II-continued

| | EXAMPLES | | | |
|---|---|---|---|---|
| | 6 | 7 | 8 | 9 |
| Shore D | 54.5 | 54.8 | * | 58 |

*Did not compound

FR is a flame retardant that contains 58% by weight Decabromodiphenyl ether, 29% by weight antimony oxide and 13% by weight EVA.

PMMA is used to indicate polymethyl methacrylate.

Example 5 clearly indicates that the flame retardant composition is not effective, when modifying a polyetherimide ester elastomer in promoting Shore D properties that are enhanced by the modifier composition of the present invention. As indicated, none of Examples 5-9, which do not constitute compositions of the present invention, had either Double Gate Notched Izod or Shore D properties improved from unmodified PEI. In Example 8, the PEI modified with just PMAA did not compound and therefore testing for the Notched Izod and Shore D properties was not possible.

What is claimed is:

1. A thermoplastic molding composition comprising:
   (A) at least one polyetherimide ester resin; and
   (B) a modifier consisting essentially of:
   a combination of at least one olefin acrylate copolymer and at least one ethylene vinyl acetate copolymer, wherein the modifier comprises from about 5 to 60 percent by weight of the total weight of (A) and (B), said composition having reduced Shore D hardness than unmodified polyetherimideester resin.

2. The composition of claim 1 wherein the olefin acrylate copolymer is an ethylene ethyl acrylate copolymer.

3. The composition of claim 1 wherein the thermoplastic molding composition contains an add-on amount of an oxidative and/or thermal stabilizer.

4. The composition of claim 1 wherein said polyetherimide ester resin is comprised of the reaction products of:
   (a) at least one diol;
   (b) at least one dicarboxylic acid or an ester forming reactive derivative thereof; and
   (c) a set of reactants selected from
   (1) (i) at least one high molecular weight poly(oxy alkylene)diamine, and (ii) at least one tricarboxylic acid or a derivative thereof, or
   (2) at least one high molecular weight polyoxyalkylene diimide diacid.

5. The composition of claim 4 wherein said diol is a low molecular weight diol.

6. The composition of claim 4 wherein said dicarboxylic acid or its derivative is an aromatic dicarboxylic acid or its derivative.

7. The composition of claim 4 wherein (c) is (1).

8. The composition of claim 7 wherein said high molecular weight poly(oxy alkylene)diamine is represented by the formula $$H_2N-G-NH_2$$

9. The composition of claim 7 wherein said tricarboxylic acid or its derivative (c) (1) (ii) is represented by the formula

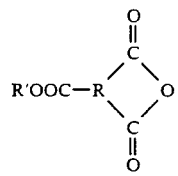

wherein R is a $C_1$ to $C_{20}$ trivalent aliphatic, cycloaliphatic or aromatic radical, and R' is hydrogen or a $C_1-C_{12}$ aliphatic monovalent radical.

10. The composition of claim 4 wherein (c) is (2).

11. The composition of claim 10 wherein said high molecular weight polyoxyalkylene diimide diacid is represented by the formula

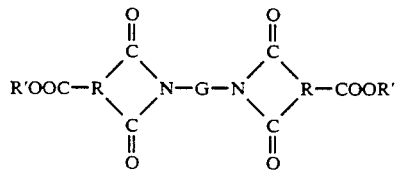

wherein:
each R is independently selected from $C_1-C_{20}$ aliphatic, cycloaliphatic or aromatic trivalent organic radicals;
each R' is independently selected from hydrogen, $C_1-C_6$ aliphatic or cycloaliphatic organic radicals, or $C_6-C_{12}$ aromatic monovalent organic radicals; and
G is the radical remaining after the removal of the amino groups of a long chain alkylene ether diamine.

12. The composition of claim 11 wherein said long chain alkylene ether diamine has an average molecular weight of from about 600 to about 12,000.

13. The composition of claim 12 wherein said long chain alkylene ether diamine has an average molecular weight of from about 900 to about 4,000.

14. The composition of claim 11 wherein each R is a $C_6$ trivalent aromatic hydrocarbon radical and each R' is hydrogen.

15. The composition of claim 1 wherein said polyetherimide ester resin is comprised of at least the following recurring structural units:

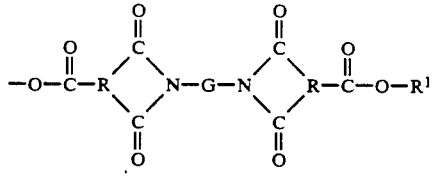

and

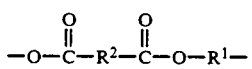

wherein:
$R^1$ is the residue of a diol absent the two hydroxyl groups;
$R^2$ is the residue of a dicarboxylic acid absent the two carboxyl groups;
R is a trivalent organic radical; and
G is the radical remaining after the removal of the amino groups of a long chain poly(oxy alkylene) diamine.

* * * * *